April 27, 1965  O. J. ABBOTT, JR  3,180,231
PULL-DOWN BROACHING MACHINE
Filed March 13, 1962  3 Sheets-Sheet 1
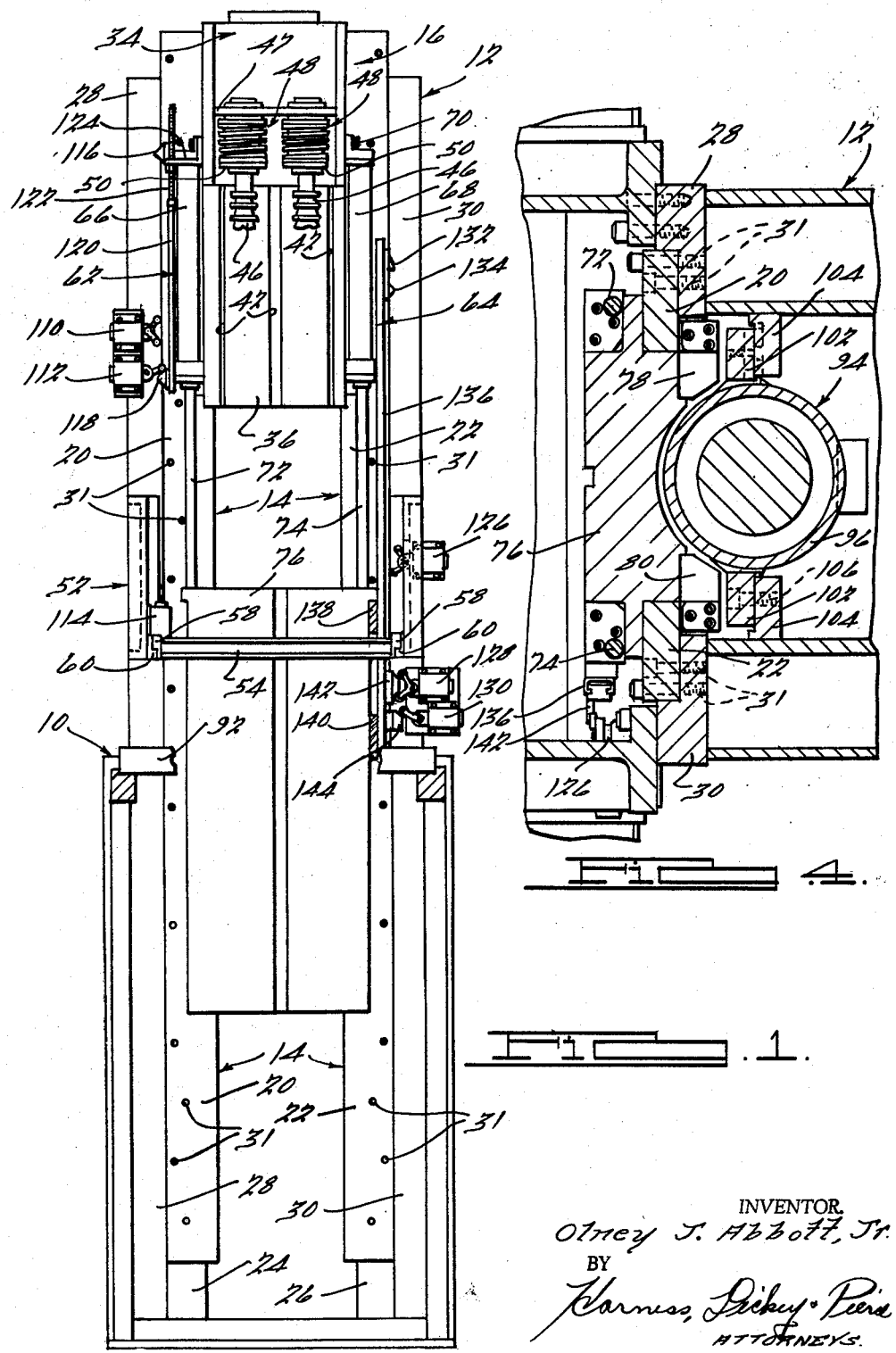
INVENTOR.
Olney J. Abbott, Jr.
BY
Harness, Dickey & Pierce
ATTORNEYS.

April 27, 1965  O. J. ABBOTT, JR  3,180,231
PULL-DOWN BROACHING MACHINE
Filed March 13, 1962  3 Sheets-Sheet 2
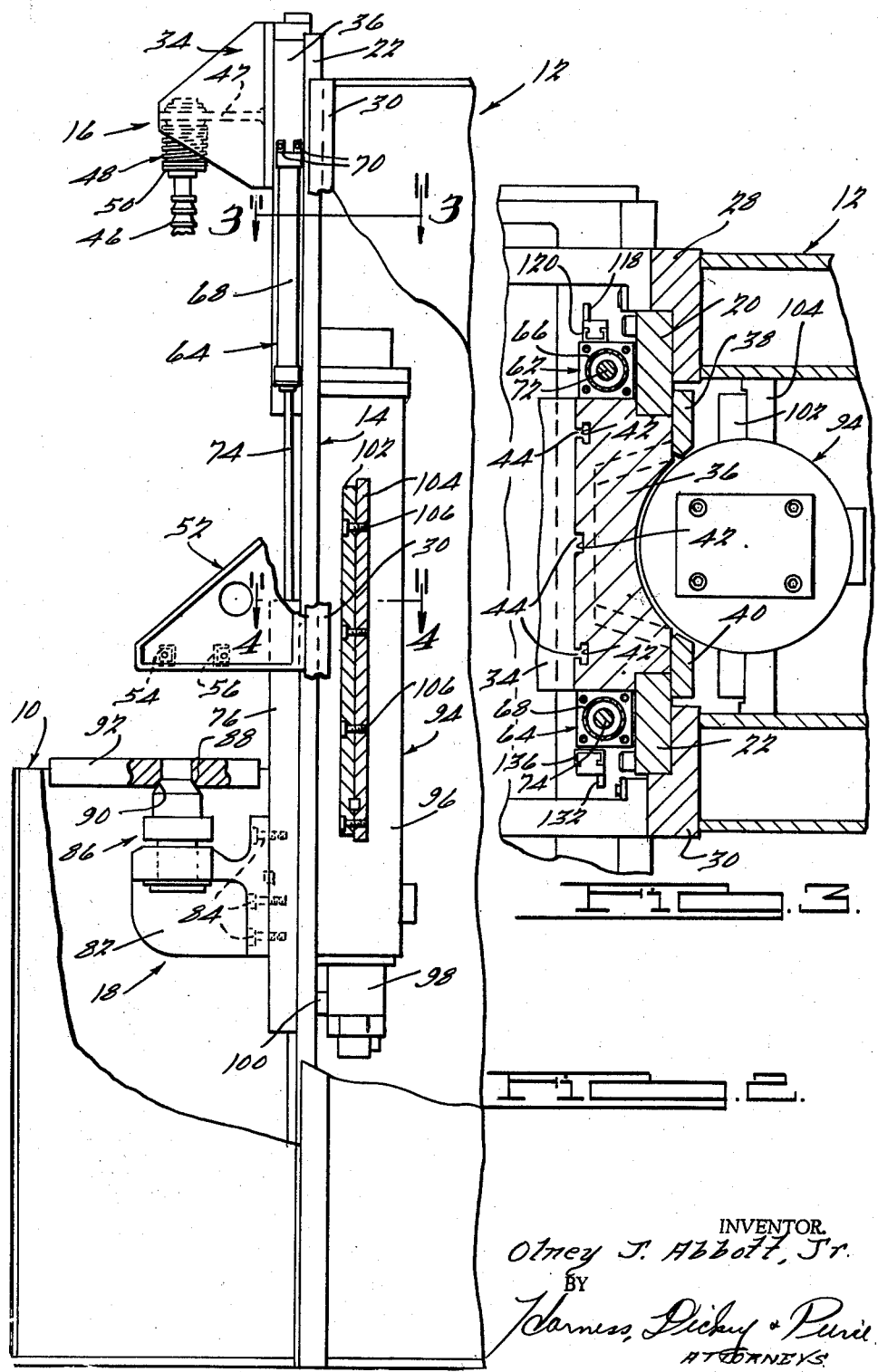
INVENTOR.
Olney J. Abbott, Jr.
BY
Harness, Dickey & Pierce
ATTORNEYS

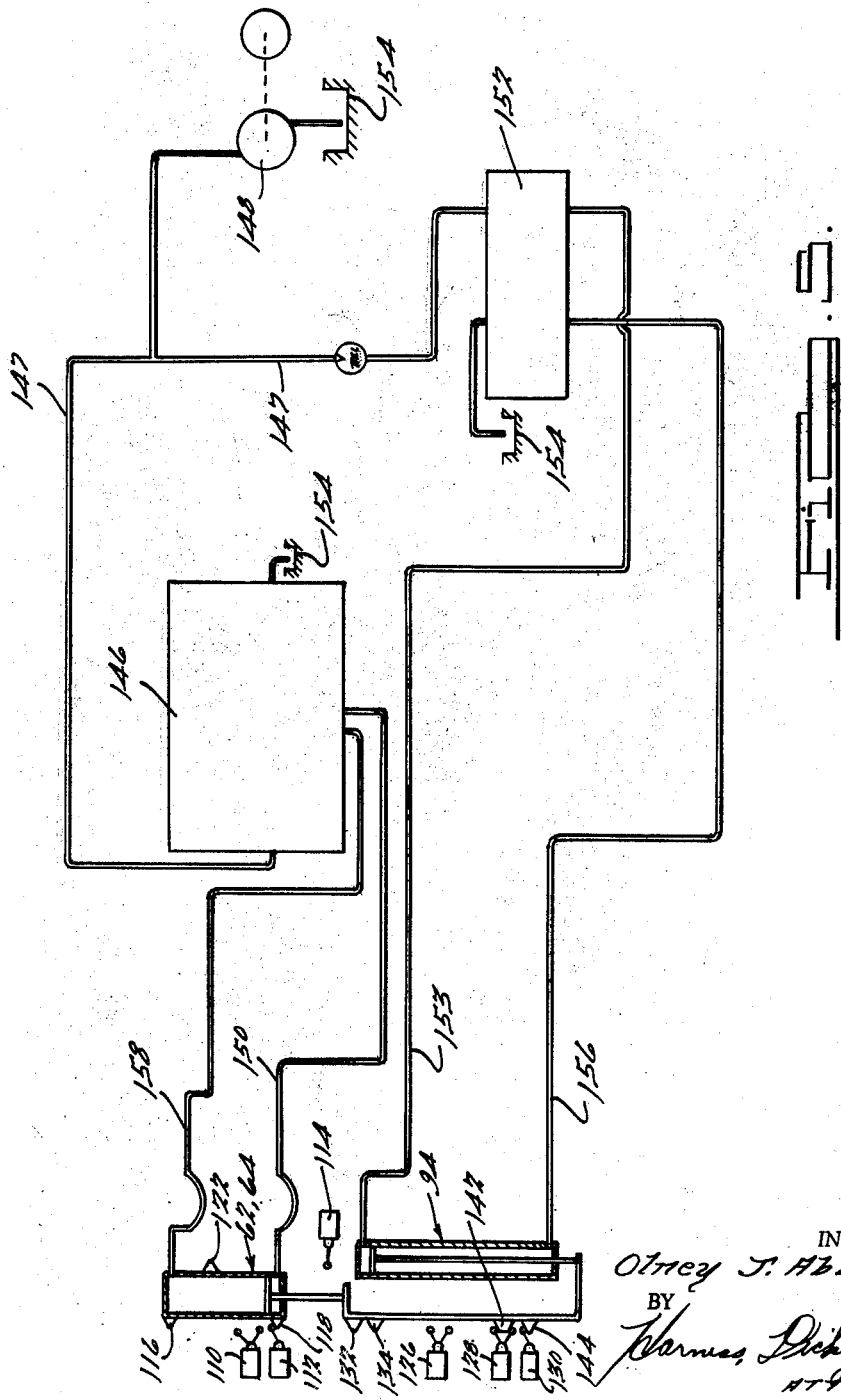

United States Patent Office 3,180,231
Patented Apr. 27, 1965

3,180,231
PULL-DOWN BROACHING MACHINE
Olney J. Abbott, Jr., Warren, Mich., assignor to Colonial Broach and Machine Company, Warren, Mich., a corporation of Delaware
Filed Mar. 13, 1962, Ser. No. 179,380
9 Claims. (Cl. 90—67)

This invention relates to automatic shuttling pull broaching machine of the type adapted to pull very long slender broaches and more particularly to improved means for aligning and pulling such long slender broaches relative to a workpiece.

Many pull broaching operations use long slender broaches which must be accurately aligned with respect to a workpiece to meet desired tolerances. Such broaches, therefore, are preferably guided on both sides of a workpiece as they are passed therethrough to prevent any tendency for the broaches to sway or drift from a predetermined alignment relative to the workpiece.

Such guidance is often provided by means including a broach-handling fixture and a broach-pulling mechanism which pulls the broach through the workpiece during the broaching operation. In such machines the broach-handling fixture is guided along a predetermined path relative to the workpiece so that the broach teeth are accurately aligned, for example, relative to rough holes in a workpiece and so that the pulling shank ends of the broaches will freely engage and lock in the broach-pulling mechanism.

In order to obtain close tolerance broaching, it is desirable that such broach-pulling mechanism be accurately aligned with the broach-handling fixture as the broaches pass through the workpiece. In many cases the broach-handling fixture may become misaligned since it is guidingly supported on structure which is independent of structure which guides the broach-pulling mechanism. In such cases, time consuming adjustments are required in order to maintain accurate broaching operations and in some cases such misalignment may go unnoticed causing the broaches to be damaged as they pass through the workpiece.

In order to prevent such misalignment, machines constructed in accordance with certain of the principles of the present invention include guide means which define a unitary slideway on which the broach-handling fixture and broach-pulling mechanism are mounted for reciprocation relative to the workpiece. Such a unitary slideway maintains the broach-handling fixture and broach-pulling mechanism in an aligned relationship relative to one another. The unitary slideway also accurately aligns the broach-handling fixture and broach-pulling mechanism relative to the workpiece during the broaching operation to avoid damage to the broaches caused by misalignment. Furthermore, the guide means defining the unitary slideway are so arranged that they may be quickly positioned so that the broach-handling fixture, broach-pulling mechanism and workpiece will be accurately aligned. Once positioned, such guide means will accurately maintain such alignment for long periods of time during which the machine is in use.

Machines having such improved unitary sideways, in accordance with certain other principles of the present invention, also include improved hydraulic and mechanical indexing and driving mechanisms for controlling the movements of the broach-handling fixture and broach-pulling mechanism on the unitary slideway through a predetermined cycle of operation.

The improved indexing and driving mechanisms include a pair of laterally spaced hydraulic cylinders which move the branch-handling fixture along the unitary slideway in a first predetermined direction for a predetermined distance until the pulling shank ends of the broaches are in operative engagement with the broach-pulling mechanism. Then a main hydraulic cylinder pulls the broach-pulling mechanism in the first predetermined direction to force the broaches through the workpiece. The broach-handling fixture continues to move in the first predetermined direction to guide the opposite ends of the broaches during the broaching operation.

Following the broaching operation, the broaches disengage from the broach-handling fixture and the main hydraulic cylinder continues to move the broach-pulling mechanism until the broaches are free of the workpiece, permitting its removal from the worktable. As the main hydraulic cylinder moves the broach-pulling mechanism in such a manner, the pair of hydraulic cylinders are controlled so that the broach-handling fixture is held open to permit the broaches to engage therein when they are returned by the broach-pulling mechanism into operative relationship therewith. The broach-handling fixture is then moved by the pair hydraulic cylinders until the broaches are free of the work area, thus completing the cycle.

Accordingly, it is an object of this invention to provide a unitary slideway for accurately aligning a broach-handling fixture and a broach-pulling mechanism relative to a workpiece mounted on an automatic shuttling type pull broaching machine.

A further object of this invention is to provide a supporting frame having a pair of laterally spaced parallel guide bars which define an accurately aligned unitary slideway along which a broach-handling fixture and a broach-pulling mechanism are shuttled relative to a workpiece.

A further object of this invention is to improve hydraulic and mechanical indexing and driving means for controlling such accurately aligned broach-handling and broach-pulling mechanism through a predetermined cycle of operation.

A further object of this invention is to improve such hydraulic and mechanical indexing and driving means by providing first hydraulic cylinder means to move a broach-handling fixture in a first predetermined direction along such a unitary slideway to carry a broach releasably engaged by said fixture into operative engagement with a broach-pulling mechanism and by providing second hydraulic cylinder means to move the broach-pulling mechanism in said first predetermined direction along the same unitary slideway to pull the broach with respect to a workpiece while the first hydraulic cylinder means continues to move the broach-handling fixture in said first predetermined direction so that both ends of the broach will be guided during the broaching operation.

A still further object of this invention is to provide a pull broaching machine of the aforementioned type which is simple in operation, inexpensive to manufacture, and rugged in construction.

Further objects, features and advantages of this invention will become apparent from a consideration of the following description, the appended claims and the accompanying drawing in which:

FIGURE 1 is a front elevational view of a broaching machine adapted to shuttle two broaches simultaneously and embodying the invention, with the broach-handling fixture in its uppermost position and with the broach-pulling mechanism being omitted for clarity;

FIG. 2 is a partially broken away side elevational view of the structure illustrated in FIG. 1 with limit switches being omitted for clarity;

FIG. 3 is a view in horizontal section taken along the line 3—3 of FIG. 2;

FIG. 4 is a view in horizontal section taken along the line 4—4 of FIG. 2; and

FIG. 5 is a diagrammatic view of the hydraulic system of the machine illustrated in FIGS. 1–4.

Referring now to the drawings, FIGURES 1–5 illustrate one embodiment of a machine constructed in accordance with certain of the principles of the present invention, including a stationary work-supporting table 10 and a vertically extending frame portion 12 which supports a unitary slideway 14 for guiding a broach-handling fixture 16 and a broach-pulling mechanism 18 during a broaching operation.

The unitary slideway 14 is defined by a pair of laterally spaced elongated guide bars or gibs 20, 22 which extend upwardly from a pair of laterally spaced supporting feet 24, 26 to the upper end of the frame 12. Each of the guide bars 20, 22 are secured on one of a pair of laterally spaced angle-shaped columns 28, 30 by means of a plurality of mutually offset vertically spaced screws 31 which are tightened to a greater or lesser degree until the guide bars 20, 22 are accurately positioned with respect to the worktable 10.

The broach-handling fixture 16 includes a bracket portion 34 which is mounted for vertical reciprocation on the aligned unitary slideway 14 by means of a broach-handling slide 36 which is slidably mounted on the upper end of the guide bars 20, 22 by means of a pair of laterally spaced slide retaining plates 38, 40 connected to the rear surface of the slide 36 so as to slidably engage the rear surfaces of the guide bars 20, 22.

The forward surface of the broach-handling slide 36 has a plurality of grooves 42 which receive a plurality of keys 44 on the rear surface of the broach-handling bracket 34 so that the bracket 34 may be vertically positioned on the slide 36 by conventional adjusting means (not shown) to handle broaches 46 of varying lengths.

A horizontal plate portion 47 of the broach-handling bracket 34 carries a pair of laterally spaced broach-handling chucks 48 generally of the automatic releasing type illustrated in Patent No. 2,539,981, issued January 30, 1951, to Benedict Welte for Broaching Machine. Such chucks 48 are adapted to receive the shank portions of the broach 46 which depend downwardly therefrom. The shank portions of such broaches are released from the broach-handling chuck 48 when a sleeve portion 50 thereon strikes a stationary abutment defined by a chuck releasing bracket 52 secured to the forward face of the columns 28, 30 at a point between the chuck-handling bracket 34 and the top of the worktable 10.

The chuck-releasing bracket 52 includes a pair of channel-shaped releasing bars 54, 56 having L-shaped brackets 58 connected to either end thereof which slidably engage grooved guideways 60 mounted on the inside wall portions of the bracket 52. The releasing bars 54, 56 may be adjustable to fit the sleeve portions 50 of different sized broach-handling chucks 48.

A pair of laterally spaced broach-handling hydraulic motors 62, 64 having cylinder portions 66, 68, respectively, are connected to opposite sides of the broach-handling slide 36 by suitable connecting means such as screws 70 for vertically reciprocating the joined broach-handling slide 36 and broach-handling bracket 34 along the unitary slideway 14.

Piston rods 72, 74 directed outwardly of the cylinders 66, 68 are fixed at the lower end portions thereof to a broach-pulling slide 76 by suitable means such as a threaded connection. The slide 76 is slidably mounted on the lower end of the guide bars 20, 22 for vertical reciprocation along the accurately aligned unitary slideway 14 defined thereby by means of a pair of slide retaining plates 78, 80 connected to the rear surface of the broach-pulling slide 76 so as to slidably engage the rear surfaces of the guide bars 20, 22.

The broach-pulling mechanism 18 includes a broach-pulling chuck bracket 82 secured by suitable connecting means such as bolts 84 to the forward face of the slide 76. The bracket 82 carries a pair of laterally spaced broach-pulling chucks 86 adapted to engage the pulling shank or lower end of the broaches 46 guided by the broach-handling chucks 48. Such broach-pulling chucks 86 are of an automatic releasing type as illustrated and described in detail in Patent No. 2,338,989, issued January 11, 1944 to Benedict Welte for Release Mechanism for Broach Pulling Chucks. They include an upper beveled surface 88 which is adapted to engage a stationary abutment 90 on the underside of a removable platen 92 mounted on top of the worktable 10. The lower end of each broach 46 is released when each broach-pulling chuck 86 is moved into engagement with the platen 92 since the conventional release mechanism portion of such broach-pulling chucks 86 will be actuated as the beveled surface 88 presses against the stationary abutment 90.

A main hydraulic motor 94 has a cylinder portion 96 carried within the vertically extending frame portion 12 by means of first and second brackets 102, 104 secured to the outer surface of the cylinder 96 and the inner surface of the frame 12, respectively, and interconnected by suitable means such as bolts 106. A piston rod 98 directed outwardly of the cylinder 96 is secured to a rigid member 100 which connects to the rear surface of the slide 76 for moving the broach-pulling mechanism 18 along the slideway 14.

The above described improved automatic pull broaching machine is controlled by indexing means including a first plurality of limit switches 110, 112 and 114. The limit switches 110, 112 are representatively illustrated as being carried on the forward face of the column 28 and the limit switch 114 is representatively illustrated as being carried on the inner face of one side wall and the release bracket 52. Each of the limit switches have conventional arm portions which are adapted to engage cam protuberances 116, 118 adjustably mounted on either end of a channel-shaped elongated member 120 which is connected to the outside surface of the hydraulic cylinder 62. The limit switch 114 is adapted to engage an adjustable screw 122 which is carried by a bracket 124 connected to the broach-handling bracket 34.

Similarly, a second plurality of limit switches 126, 128, 130 are mounted on the opposite side of the machine with one of the limit switches 126 being representatively supported on the right side wall of the release bracket 52. The limit switches 128, 130 are representatively illustrated as being connected to the vertically extending frame 12 adjacent the work-supporting table 10. Limit switches 126, 128 are adapted to engage trigger means such as cam protuberances 132, 134 adjustably mounted on the upper end of an elongated channel-shaped bar 136 which connects to one side of the broach-pulling slide 76 through rigid members 138, 140. A pair of cam protuberances 142, 144 mounted on the opposite end of the elongated bar 136 trigger the limit switches 128, 130.

In operation, when the broach-handling chucks 48 are in the uppermost position, as illustrated in FIG. 1, the workpiece to be broached is positioned on the removable platen 92 with rough holes or the like being aligned with broaches 46 carried by the broach-handling chucks 48. In this position the lower end portions of the broaches 46 are raised above the workpiece on the removable platen 92. A start switch (not shown) is pressed to energize suitable conventional electrical control means (not shown) which shifts a conventional solenoid actuated four-way broach-handling valve 146 (FIG. 5) so that pressurized fluid passes from a discharge line 147 of a conventional pump 148 through a line 150 to pressurize the bottom portion of the hydraulic motors 62, 64. The cylinders 66, 68 then move downwardly until the cam protuberance 116 trips the limit switch 110. This causes the electrical control means to shift a solenoid-actuated main four-way valve 152 in a conventional manner to direct pressurized fluid from the discharge line 147 of the pump 148 through a line 153 into the top portion of the main hydraulic motor 94 to initiate downward movement of the broach-pulling mechanism 18.

At this point the lower end of the broaches 46 are engaged by the broach-pulling chucks 86 on the opposite side of the workpiece mounted on the platen 92. The hydraulic motors 62, 64 and 94 continue to move the broach-handling fixture 16 and broach-pulling mechanism 18 downwardly. This moves the broaches 46 through the workpiece to carry out the broaching operation. The broaches 46 are secured at their opposite ends by the broach-handling fixture 16 and broach-pulling mechanism 18, respectively, during the broaching operation to prevent sway or bending of the long slender broaches 46 relative to the workpiece.

The broach-handling slide 36 and broach-pulling slide 76 both shuttle on the unitary slideway 14 defined by the guide bars 20, 22 which are accurately located relative to the platen 92. The broaches 46, therefore, are maintained in accurate alignment during the broaching operation. Such alignment assures close tolerance broaching and the broaches 46 are able to pass through the workpiece without being damaged by bending and the like which might otherwise result from misalignment.

Following the broaching operation, the broach-handling fixture 16 and broach-pulling mechanism 18 are moved downwardly until the screw 122 triggers the limit switch 114 to shift the handling four-way valve 146 to a position in which fluid is freely circulated therethrough from the upper and lower chambers of the hydraulic motors 62, 64 to a suitable fluid reservoir or tank 154.

When the hydraulic motors 62, 64 are in this midway position the sleeve portions 50 of the broach-handling chucks 48 engage the release bars 54, 56 carried by the release bracket 52 to disengage the upper ends of the broaches 46 from the broach-handling fixture 16 so that they can be carried below the workpiece by the broach-pulling mechanism 18 which continues to be driven downwardly by the main hydraulic motor 94. The broach-handling chucks 48 are maintained downwardly against the release bracket 52 by gravity as the main hydraulic motor 94 continues to move downwardly. Since both the upper and lower chambers of the hydraulic motor 62, 64 are connected to the tank 154, the piston rods 72, 74 are free to continue to move downwardly with the broach-pulling slide 76.

During the downward movement of the broach-pulling mechanism 18, the cam protuberances 132, 142 trip the limit switches 126, 128 respectively, to cause the main four-way valve 152 to be shifted so that pressurized fluid from the pump 148 no longer communicates with the hydraulic motor 94. At this point, the upper end of the broaches are located below the workpiece permitting its removal from the platen 92.

Then a return button (not shown) is pressed to energize conventional electrical control means which shift the main four-way valve 152 to cause pressurized fluid to pass from the pump 148 through a line 156 to pressurize the lower end of the hydraulic motor 94 to move the broach-pulling mechanism 18 upwardly until the upper beveled surfaces 88 of the broach-pulling chucks 86 engage the stationary abutments 90 on the platen 92 causing the lower ends of the broaches 46 to be released from the broach-pulling mechanism 18.

When the return button is pressed, the handling four-way valve 146 is also shifted to cause pressurized fluid from the pump 148 to pass through the line 150 to pressurize the lower ends of the hydraulic motors 62, 64 to hold the broach-handling slide 36 in its lower position. The broach-handling chucks 48 are, therefore, pressed against the release bracket 52 and remain open to receive the upper end of the broaches 46.

When the upper ends of the broaches 46 engage the broach-handling chucks 48, the limit switch 126 has been tripped by the cam protuberance 132. This energizes portions of the electric control means to cancel the effect of releasing the limit switch 114 as the triggering screw 122 is moved upwardly therefrom. Thus, the motor 94 moves both the slides 36, 76 upwardly on the unitary slideway 14 to move the broach-handling mechanism 16 and the broach-pulling mechanism 18 upwardly until the broach-pulling chucks 86 engage the platen 92 at which point the lower end of the broaches are released. During this upward movement the cam protuberance 116 trips the limit switch 110.

Once the broach-pulling chucks 86 engage the platen 92 the cam protuberances 142, 144 trip the limit switches 128, 130 to terminate upward movement of the main hydraulic motor 94.

The broach-handling fixture 16 continues to move upwardly since tripping of the limit switches 128, 130 causes the broach-handling four-way valve 146 to shift so that pressurized fluid will pass through a line 158 to the upper ends of the hydraulic motors 62, 64 until the broach-handling mechanism 16 is in its uppermost position, at which point the limit switch 112 is tripped by the cam protuberance 118 to stop the machine.

The improved unitary slideway 14 defined by the guide bars 20, 22 can obviously be incorporated in machines of the vertical pull-up type or be incorporated in machines having dual ram, alternate stroke stations with side portions traveling in opposed directions. In such machines an operator loads and unloads one side of machine while the other side is broaching in order to increase output.

It will be understood that the specific construction of the improved pull-down broaching machine which is herein disclosed and described is presented for purposes of explanation and illustration, and is not intended to indicate limits of the invention, the scope of which is defined by the following claims.

What is claimed is:

1. In a machine for broaching a workpiece, a work support adapted to secure a workpiece against force exerted during the broaching operation, an elongated frame located adjacent said work support, broach-handling means located on one side of said work support for carrying a broach toward and from said work support, broach-pulling means located on the opposite side of said work support for pulling a broach relative to the workpiece, and stationary guide means defining a continuous unitary slideway along substantially the entire length of said elongated frame and extending to either side of said work support adapted to slidably support said broach-handling means and said broach-pulling means in aligned relationship with a workpiece.

2. In a machine for broaching a workpiece, a work support adapted to secure a workpiece against force exerted during the broaching operation, an elongated frame located adjacent said work support, broach-handling means located on one side of said work support for carrying a broach toward and from said work support, broach-pulling means located on the opposite side of said work support for pulling a broach relative to the workpiece, and a pair of laterally spaced continuous guide bars defining a unitary slideway along substantially the entire length of said elongated frame and extending to either side of said work support and adapted to slidably support said broach-handling means and said broach-pulling means an aligned relationship with a workpiece.

3. In a machine for broaching a workpiece, a work support adapted to secure a workpiece against force exerted during the broaching operation, an elongated frame located adjacent said work support, a pair of laterally spaced continuous guide bars defining a unitary slideway along substantially the entire length of said elongated frame and extending to either side of said work support, broach-handling means located on one side of said work support including a first slide mounted for reciprocation on one end of said unitary slideway, and broach-pulling means located on the opposite side of said work support including a second slide mounted for reciprocation on the opposite end of said unitary slideway, said first and second slides coacting with said unitary slideway to maintain a broach connected between said broach-handling means and said broach-pulling means in aligned relationship with the workpiece.

4. In a machine for broaching a workpiece, a work support adapted to secure a workpiece against force exerted during the broaching operation, an elongated frame located adjacent said work support, broach-handling means located on one side of said work support including a first slide and a pair of laterally spaced broach-handling cylinder and piston units operatively connected to said first slide for moving a broach toward and from said work support, broach-pulling means located on the opposite side of said work support including a second slide and a broach-pulling cylinder and piston unit operatively connected thereto for pulling a broach relative to the workpiece, and a pair of laterally spaced continuous guide bars defining a unitary slideway along substantially the entire length of said elongated frame and on either side of said work support, said first and second slides being mounted for reciprocation on said unitary slideway and coacting therewith to maintain a broach connected between said broach-handling means and said broach-pulling means in aligned relationship with the workpiece.

5. In a machine for broaching a workpiece, a work support adapted to secure a workpiece against force exerted during the broaching operation, an elongated frame located adjacent said work support, broach-handling means located on one side of said work support including a first slide and a pair of laterally spaced broach-handling cylinder and piston units operatively connected to said first slide for moving a broach toward and from said work support, broach-pulling means located on the opposite side of said work support including a second slide and a broach-pulling cylinder and piston unit operatively connected thereto for pulling a broach relative to a workpiece, and a pair of laterally spaced continuous guide bars defining a unitary slideway along substantially the entire length of said elongated frame and on either side of said work support, said pistons of said broach-handling cylinder and piston units connecting to said second slide, and said first and second slides being mounted for reciprocation on said unitary slideway and coacting therewith to maintain a broach connected between said broach-handling means and said broach-pulling means in aligned relationship with the workpiece.

6. In a machine for broaching a workpiece, a work support adapted to secure a workpiece against force exerted during the broaching operation, an elongated frame located adjacent said work support, broach-handling means located on one side of said work support including a first slide for moving a broach toward and from said work support, broach-pulling means located on the opposite side of said work support including a second slide for pulling a broach relative to the workpiece, a pair of laterally spaced continuous guide bars defining a unitary slideway along substantially the entire length of said elongated frame and on either side of said work support, said first and said second slides being mounted for reciprocation on said unitary slideway and coacting therewith to maintain a broach connected between said broach-handling means and said broach-pulling means in aligned relationship with the workpiece during a broaching operation, and means mounted on said elongated frame between said broach-handling means and said work support for releasing a broach from said broach-handling means following a broaching pass.

7. In a machine for broaching a workpiece, a work support adapted to support a workpiece against force exerted during the broaching operation, an elongated frame extending substantially perpendicular to said work support and on either side thereof, a pair of continuous laterally spaced guide bars secured on said frame and extending parallel to the direction of movement of the broach and on either side of said work support, a first slide mounted on said guide bars on one side of the work support for reciprocation toward and from said work support, a broach-handling chuck secured to said slide and adapted to releasably engage one end of a broach and guide the broach toward and from said work support, a second slide mounted on said guide bars on the opposite side of said work support for reciprocation toward and from said work support, and a broach-pulling chuck secured to said second slide adapted to releasably engage the opposite end of the broach and guide the broach during the broaching operation.

8. In a machine for broaching a workpiece, a work support adapted to support a workpiece against force exerted during the broaching operation, an elongated frame extending substantially perpendicular to said work support and on either side thereof, a pair of continuous laterally spaced guide bars secured on said frame and extending parallel to the direction of movement of the broach and on either side of said work support, a first slide mounted on said guide bars on one side of the work support for reciprocation toward and from said work support, a broach-handling chuck secured to said slide and adapted to releasably engage one end of a broach and guide the broach toward and from said work support, a second slide mounted on said guide bars on the opposite side of said work support for reciprocation toward and from said work support, a broach-pulling chuck secured to said second slide adapted to releasably engage the opposite end of the broach and guide the broach during the broaching operation, and a pair of laterally spaced broach-handling cylinder and piston units having the cylinders thereof connected to said first slide and the pistons thereof connected to said second slide for moving said first slide toward and from said work support.

9. In a machine for broaching a workpiece, a work support adapted to support a workpiece against force exerted during the broaching operation, an elongated frame extending substantially perpendicular to said work support and on either side thereof, a pair of continuous laterally spaced elongated guide bars secured on said frame and extending parallel to the direction of movement of the broach and on either side of said work support, a first slide mounted on said guide bars on one side of the work support for reciprocation toward and from said work support, a broach-handling chuck secured to said slide and adapted to releasably engage one end of a broach and guide the broach toward and from said work support, a second slide mounted on said guide bars on the opposite side of said work support for reciprocation toward and from said work support, a broach-pulling chuck secured to said second slide adapted to releasably engage the opposite end of the broach and guide the broach during the broaching operation, a pair of laterally spaced broach-handling cylinder and piston units having the cylinders thereof connected to said first slide and the pistons thereof connected to said second slide for moving said first slide toward and from said work support, and a broach-pulling cylinder and piston unit having the piston thereof connected to said second slide for moving said second slide toward and from said work support.

References Cited by the Examiner

UNITED STATES PATENTS

| 1,669,403 | 5/28 | Danserau | 90—67 |
| 1,669,404 | 5/28 | Danserau | 90—67 |
| 1,669,405 | 5/28 | Danserau | 90—67 |

WILLIAM W. DWYER, JR., *Primary Examiner.*